US009896095B2

(12) United States Patent
Katoh (10) Patent No.: US 9,896,095 B2
(45) Date of Patent: Feb. 20, 2018

(54) COLLISION AVOIDANCE SUPPORT DEVICE (71) Applicant: TOYOTA JIDOSHA KABUSHIKI KAISHA, Toyota-shi, Aichi-ken (JP)

(72) Inventor: Masayuki Katoh, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/239,322

(22) Filed: Aug. 17, 2016

(65) Prior Publication Data
US 2017/0057498 A1 Mar. 2, 2017

(30) Foreign Application Priority Data
Aug. 28, 2015 (JP) .................. 2015-168428

(51) Int. Cl.
*B60W 30/09* (2012.01)
*B60W 10/18* (2012.01)
*B60W 10/184* (2012.01)
*B60W 10/20* (2006.01)
*B60W 30/095* (2012.01)
*B60W 40/105* (2012.01)
*B60W 40/04* (2006.01)
*B60W 50/00* (2006.01)

(52) U.S. Cl.
CPC ............ *B60W 30/09* (2013.01); *B60W 10/18* (2013.01); *B60W 10/184* (2013.01); *B60W 10/20* (2013.01); *B60W 30/0953* (2013.01); *B60W 30/0956* (2013.01); *B60W 40/04* (2013.01); *B60W 40/105* (2013.01); *B60W 2050/0094* (2013.01); *B60W 2520/10* (2013.01); *B60W 2550/10* (2013.01); *B60W 2710/18* (2013.01); *B60W 2710/20* (2013.01)

(58) Field of Classification Search
CPC .... B60W 30/09; B60W 10/18; B60W 10/184; B60W 10/20; B60W 30/0953
USPC ........................................... 701/41
See application file for complete search history.

(56) References Cited

U.S. PATENT DOCUMENTS

| 5,332,057 | A | 7/1994 | Butsuen et al. | |
|---|---|---|---|---|
| 2009/0299593 | A1* | 12/2009 | Borchers | B60W 10/184 701/70 |
| 2014/0316668 | A1* | 10/2014 | Akiyama | B60W 10/184 701/70 |

FOREIGN PATENT DOCUMENTS

| EP | 1927499 A1 | 6/2008 |
|---|---|---|
| JP | H05-058319 A | 3/1993 |
| JP | 2002-092795 A | 3/2002 |
| JP | 2006-188129 A | 7/2006 |
| JP | 3978283 B2 | 9/2007 |

(Continued)

*Primary Examiner* — Yazan Soofi
(74) *Attorney, Agent, or Firm* — Oliff PLC (57) ABSTRACT

When a host vehicle travels while being decelerated by an intervention of automatic braking, a support ECU calculates a collision prediction speed at a collision prediction position and determines whether or not the collision prediction speed exceeds a collision prediction speed threshold. The support ECU allows an automatic steering for collision avoidance to intervene only in a case where the collision prediction speed is determined to be equal to or less than the collision prediction speed threshold and prohibits the intervention of the automatic steering in a case where the collision prediction speed is determined to exceed the collision prediction speed threshold.

4 Claims, 7 Drawing Sheets

(56) References Cited

FOREIGN PATENT DOCUMENTS

JP  2012-116403 A  6/2012

\* cited by examiner

COLLISION AVOIDANCE SUPPORT DEVICE

INCORPORATION BY REFERENCE

The disclosure of Japanese Patent Application No. 2015-168428 filed on Aug. 28, 2015 including the specification, drawings and abstract is incorporated herein by reference in its entirety.

BACKGROUND

1. Technical Field

The disclosure relates to a collision avoidance support device that supports a driver so that a host vehicle avoids a collision with an obstacle.

2. Description of Related Art

A vehicle that is provided with a collision avoidance support device is known. In a case where an obstacle with which a host vehicle is highly likely to collide is detected by a sensor such as a camera sensor and a radar sensor, the collision avoidance support device decelerates the host vehicle by using automatic braking. In addition, as disclosed in Japanese Patent Application Publication No. 2012-116403, for example, a collision avoidance support device that automatically steers the host vehicle to separate the host vehicle from the obstacle by using a steering device in addition to the automatic braking is also known.

When the automatic steering is performed in a situation in which a relative speed of the host vehicle with respect to the obstacle or a speed of the host vehicle is insufficiently reduced despite the deceleration of the host vehicle by the execution of the automatic brake, an accurate control of a traveling course of the host vehicle with respect to the obstacle becomes difficult. For example, a variation occurs in an avoidance trajectory for obstacle avoidance by the host vehicle as the relative speed or the speed of the host vehicle increases. Accordingly, an appropriate movement of the host vehicle to an avoidance space for the obstacle avoidance might become impossible.

In addition, in a case where the automatic steering is performed, effects on the other obstacles that are present around the host vehicle need to be taken into account more than in a case where the automatic braking is performed. Accordingly, in a case where the collision avoidance support is performed, it is desirable that the collision avoidance support is carried out by the automatic braking alone whenever possible. Hence, when an intervention of the automatic steering is performed in an inappropriate manner, the intervention of the automatic steering might backfire.

SUMMARY

The embodiments have been made in view of the above-described circumstances, and an object thereof is to appropriately perform an intervention of an automatic steering in a case where the automatic steering is performed in addition to an automatic braking.

In order to achieve the object described above, an aspect of the disclosure provides a collision avoidance support device comprising: an obstacle detector configured to detect whether an obstacle is present in front of a host vehicle; and a control system that controls: (i) an automatic braking system to cause automatic braking, in which a braking force is generated in a vehicle wheel, to occur in a case where the host vehicle is determined to likely collide with a detected obstacle, and (ii) an automatic steering system to cause automatic steering, in which a steering wheel of the host vehicle is automatically turned to perform collision avoidance, to occur in the case where the host vehicle is determined to likely collide with the detected obstacle despite deceleration of the host vehicle caused by the automatic braking. The control system (a) estimates whether or not a collision prediction speed representing a predicted relative speed of the host vehicle with respect to the detected obstacle or representing a vehicle speed of the host vehicle at a position where the host vehicle is predicted to collide with the detected obstacle after traveling while being decelerated by the automatic braking is higher than a collision speed threshold without performing the automatic steering, or (b) estimates whether or not a braking initiation speed during the automatic braking representing the relative speed of the host vehicle with respect to the detected obstacle or representing the vehicle speed of the host vehicle at a time of initiation of the automatic braking is higher than a speed threshold without performing the automatic steering. The control system prohibits performance of the automatic steering when the control system estimates that the collision prediction speed is higher than the collision speed threshold or that the braking initiation speed is higher than the speed threshold.

According to embodiments, the obstacle detector detects whether the obstacle is present in front of the host vehicle. The automatic braking system causes automatic braking, which generates the braking force in the vehicle wheel, to occur in the case where the host vehicle is determined to likely collide with the detected obstacle. The possibility of the collision between the host vehicle and the detected obstacle can be determined by the use of, for example, a predicted length of time until the collision of the host vehicle with the detected obstacle. The automatic steering system causes the automatic steering, in which the steering wheel of the host vehicle is automatically turned to perform collision avoidance, to occur in the case where the host vehicle is determined to likely collide with the detected obstacle despite the deceleration of the host vehicle by the automatic braking. Accordingly, the collision between the host vehicle and the detected obstacle can be avoided by the automatic steering.

When the automatic steering is performed in a situation in which the relative speed of the host vehicle with respect to the detected obstacle or the speed of the host vehicle cannot be sufficiently reduced, an accurate control of a traveling course of the host vehicle with respect to the detected obstacle becomes difficult. Accordingly, when the intervention of the automatic steering is performed in an inappropriate manner, the intervention of the automatic steering might backfire. In this regard, the control system controls the automatic braking and steering systems as described above and below.

The control system estimates whether or not the collision prediction speed representing the predicted relative speed of the host vehicle with respect to the detected obstacle or representing the vehicle speed of the host vehicle at the position where the host vehicle is predicted to collide with the detected obstacle after traveling while being decelerated by the automatic braking is higher than the collision speed threshold without performing the automatic steering. This collision prediction speed represents the predicted relative speed of the host vehicle with respect to the detected obstacle or the vehicle speed of the host vehicle at the position where the host vehicle is predicted to collide with the detected obstacle after traveling while being decelerated by the automatic braking. Alternatively, the control system estimates whether or not the braking initiation speed during the braking representing the relative speed of the host vehicle with respect to the detected obstacle or representing the vehicle speed of the host vehicle at the time of the initiation of the automatic braking is higher than the speed threshold without performing the automatic steering. This braking initiation speed represents the relative speed of the host vehicle with respect to the detected obstacle or the vehicle speed of the host vehicle at the time of the initiation of the automatic braking.

In a situation in which the host vehicle is predicted to collide with the obstacle despite the intervention of the automatic braking, for example, the host vehicle is decelerated with a deceleration close to a limit, and thus the deceleration is subjected to no significant variation. Accordingly, the collision prediction speed can be estimated to some extent from the speed during the initiation of the braking. Accordingly, the control system may perform the estimation of whether or not the collision prediction speed exceeds the collision speed threshold and may perform the estimation of whether or not the braking initiation speed exceeds the speed threshold during the initiation of the braking. The relative speed of the host vehicle with respect to the detected obstacle corresponds to a value that is obtained by subtracting the speed of the host vehicle in a direction in which the host vehicle travels on the part of the detected obstacle from the speed of the host vehicle.

The accuracy of the automatic steering might decline as the collision prediction speed or the braking initiation speed increases. In this regard, the control system prohibits performance of the automatic steering in a case where the collision prediction speed is determined to be higher than the collision speed threshold or in a case where the braking initiation speed is higher than the speed threshold. Accordingly, the automatic steering can be appropriately performed in a case where the automatic steering is performed in addition to the automatic braking.

According to some embodiments, the control system is configured to calculate the collision prediction speed at a predetermined calculation cycle and determine whether or not the calculated collision prediction speed is higher than the collision speed threshold when the host vehicle travels while being decelerated by the automatic braking.

In this aspect, the control system calculates the collision prediction speed at the predetermined calculation cycle when the host vehicle travels while being decelerated by the automatic braking. Accordingly, the collision prediction speed can be accurately calculated. The collision prediction speed can be calculated based on, for example, a distance between the host vehicle and the detected obstacle, the relative speed of the host vehicle with respect to the detected obstacle, and the deceleration of the host vehicle. The control system determines whether or not the calculated collision prediction speed is higher than the collision speed threshold. According to this aspect, the automatic steering can be highly appropriately performed in this manner.

According to some embodiments, the control system is configured to detect the speed during the initiation of the braking and determine whether or not the detected speed during the initiation of the braking is higher than the speed threshold.

According to this aspect, the control system detects the speed during the initiation of the braking and determines whether or not the detected speed during the initiation of the braking is higher than the speed threshold. Hence, according to this aspect, the automatic steering can be prohibited in an early stage in which the automatic braking is performed.

According to some embodiments, the control system determines whether the obstacle is a stationary object or a moving object, and sets the collision speed threshold to a higher value in a case where it is determined that the obstacle is the stationary object than in a case where it is determined that the obstacle is the moving object.

The amount of movement of the obstacle needs to be taken into account in a case where the collision avoidance is carried out by the automatic steering, and a detection variation of the amount of movement occurs in a case where the obstacle is the moving object. Accordingly, in a case where the obstacle is the moving object, the traveling course of the host vehicle based on the automatic steering needs to be controlled with a high level of accuracy. In a case where the obstacle is the stationary object, in contrast, the accuracy of the traveling course control based on the automatic steering can be loosened compared to a case where the obstacle is the moving object.

According to some embodiments, the control system determines whether the obstacle is the stationary object or the moving object, and sets the collision speed threshold to the higher value in a case where it is determined that the obstacle is the stationary object than in a case where it is determined that the obstacle is the moving object. Accordingly, the automatic steering is more likely to intervene in a case where the obstacle is the stationary object than in a case where the obstacle is the moving object. Hence, according to this aspect, an appropriate intervention of the automatic steering can be performed in accordance with the type of the obstacle (moving object/stationary object).

According to some embodiments, the control system determines whether the obstacle is a stationary object or a moving object, and sets the speed threshold during the initiation of the braking to a higher value in a case where it is determined that the obstacle is the stationary object than in a case where it is determined that the obstacle is the moving object.

According to this aspect, the appropriate intervention of the automatic steering can be performed in accordance with the type of the obstacle.

The disclosure is not limited to the aspects and embodiments as summarized above.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
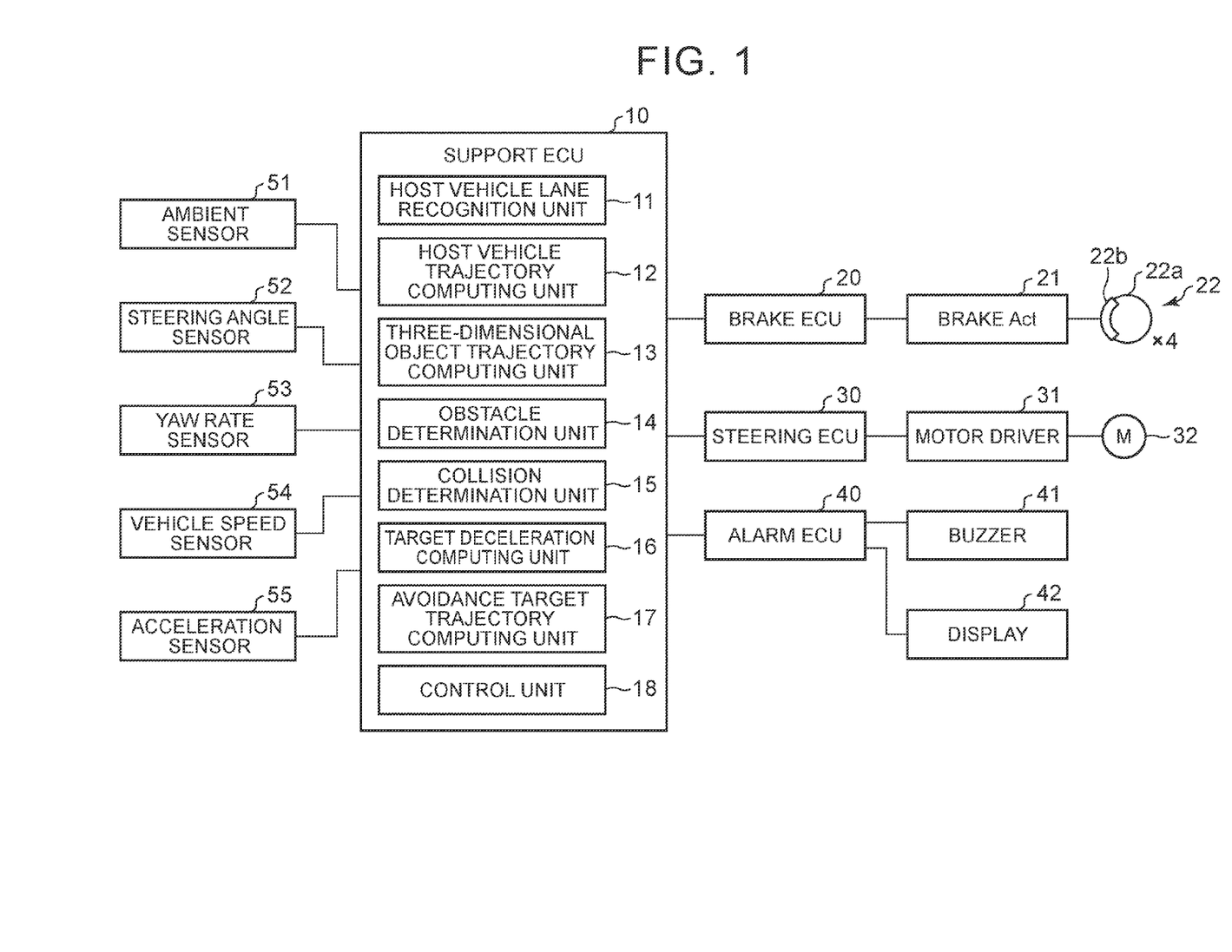
FIG. 1 is a schematic system configuration diagram of a collision avoidance support device according to embodiments.

Hereinafter, embodiments will be described in detail with reference to accompanying drawings. FIG. 1 is a schematic system configuration diagram of a collision avoidance support device according to one embodiment.

The collision avoidance support device is provided with a support ECU 10, a brake ECU 20, a steering ECU 30, and an alarm ECU 40. Each of the ECUs 10, 20, 30, 40 is provided with a microcomputer as a main portion. The ECUs 10, 20, 30, 40 are connected to each other to be capable of transmitting and receiving various types of control information and request signals to and from each other via a controller area network (CAN, not illustrated). The ECU is an abbreviation of electronic control unit. In this specification, the microcomputer includes a CPU and a storage device such as a ROM and a RAM, and the CPU realizes various functions by executing instructions (programs) stored in the ROM. In this specification, a vehicle in which the collision avoidance support device is mounted will be referred to as a "host vehicle".

The support ECU 10 is connected to an ambient sensor 51, a steering angle sensor 52, a yaw rate sensor 53, a vehicle speed sensor 54, and an acceleration sensor 55. The ambient sensor 51 has a function for acquiring information relating to at least a road in front of the host vehicle and a three-dimensional object that is present on the road. Examples of the three-dimensional object include a moving object such as a pedestrian, a bicycle, and an automobile and a stationary object such as a utility pole, a tree, and a guardrail.

The ambient sensor 51 is provided with, for example, a radar sensor and a camera sensor. The radar sensor irradiates the vicinity (including at least in front) of the host vehicle with, for example, a millimeter-waveband radio wave. In a case where the three-dimensional object is present, the radar sensor receives a reflected wave from the three-dimensional object and calculates the presence or absence of the three-dimensional object and a relative relationship between the host vehicle and the three-dimensional object (such as a distance between the host vehicle and the three-dimensional object and relative speeds of the host vehicle and the three-dimensional object) based on the timing of the radio wave irradiation and the timing of the radio wave reception.

The camera sensor is provided with a stereo camera or the like. The camera sensor images landscapes on the right and left in front of the vehicle and calculates the shape of the road, the presence or absence of the three-dimensional object, the relative relationship between the host vehicle and the three-dimensional object, and the like based on the imaged data on the right and left. In addition, the camera sensor recognizes a lane marker such as right and left white lines on the road (hereinafter, referred to as white lines) and calculates the shape of the road and a positional relationship between the road and the host vehicle.

The information acquired by the ambient sensor 51 will be referred to as target object information. The ambient sensor 51 repeatedly transmits the target object information to the support ECU 10 at a predetermined cycle. The ambient sensor 51 does not necessarily have to be provided with the radar sensor and the camera sensor. For example, the ambient sensor 51 may use a sensor that satisfies a detection accuracy requirement. In addition, navigation system information can also be used with regard to the information showing the shape of the road on which the host vehicle travels and the positional relationship between the road and the host vehicle.

The steering angle sensor 52 detects a steering angle of the host vehicle and transmits the detection signal to the support ECU 10. The yaw rate sensor 53 detects a yaw rate acting on the host vehicle and transmits the detection signal to the support ECU 10. The vehicle speed sensor 54 detects a traveling speed of the host vehicle (hereinafter, referred to as a vehicle speed) and transmits the detection signal to the support ECU 10. The acceleration sensor 55 detects a longitudinal acceleration that is an acceleration acting in a longitudinal direction of the host vehicle and a lateral acceleration that is an acceleration acting in a horizontal direction of the host vehicle (vehicle width direction) and transmits the detection signals to the support ECU 10. The vehicle speed sensor 54 may be configured to transmit a signal of a vehicle wheel speed sensor instead of the vehicle speed sensor 54 to the support ECU 10 so that the vehicle speed is calculated based on a count value obtained by a pulse signal of the vehicle wheel speed sensor disposed in each vehicle wheel of the host vehicle being counted.

The support ECU 10 detects an obstacle that is present in front of the host vehicle based on the detection signals from these sensors. In a case where the host vehicle is highly likely to collide with the obstacle, the support ECU 10 transmits a braking command for collision avoidance to the brake ECU 20, and transmits a steering command for collision avoidance to the steering ECU 30 if necessary. A processing by the support ECU 10 will be described later.

The brake ECU 20 is connected to a brake actuator 21. The brake actuator 21 is disposed in a hydraulic circuit between a master cylinder (not illustrated) that pressurizes hydraulic oil with a brake pedal effort and friction brake mechanisms 22 that are disposed in the right, left, front, and rear wheels. The friction brake mechanism 22 is provided with a brake disc 22a that is fixed to the vehicle wheel and a brake caliper 22b that is fixed to a vehicle body. The friction brake mechanism 22 generates a hydraulic braking force by operating a wheel cylinder built into the brake caliper 22b with the hydraulic pressure of the hydraulic oil supplied from the brake actuator 21 and pressing a brake pad against the brake disc 22a.

The brake actuator 21 is a known actuator that adjusts the hydraulic pressure which is supplied to the wheel cylinder built into the brake caliper 22b. The brake actuator 21 generates the braking force in the right, left, front, and rear wheels by supplying the wheel cylinder with the hydraulic pressure depending on a control command from the brake ECU 20.

The steering ECU 30 is a control device for an electric power steering system. The steering ECU 30 is connected to a motor driver 31. The motor driver 31 is connected to a steering motor 32. The steering motor 32 is incorporated into a steering mechanism (not illustrated) and steers a steering wheel right and left with rotation of a rotor by electric power supplied from the motor driver 31.

Usually, the steering ECU 30 detects a driver's steering torque and generates an assist torque depending on the steering torque in the steering motor 32. In a case where the steering command for collision avoidance that is transmitted from the support ECU 10 is received when no steering operation is performed by the driver, however, the steering ECU 30 steers the steering wheel by controlling the driving of the steering motor 32 in accordance with the steering command.

The alarm ECU 40 is connected to a buzzer 41 and a display 42. The alarm ECU 40 calls the driver's attention by sounding the buzzer 41 in accordance with a command from the support ECU 10 and displays a collision avoidance support control operation situation by using the display 42 in a case where the host vehicle is highly likely to collide with the obstacle.

Hereinafter, functions of the support ECU 10 will be described. Focusing on the functions of the support ECU 10, the support ECU 10 is provided with a host vehicle lane recognition unit 11, a host vehicle trajectory computing unit 12, a three-dimensional object trajectory computing unit 13, an obstacle determination unit 14, a collision determination unit 15, a target deceleration computing unit 16, an avoidance target trajectory computing unit 17, and a control unit 18.

The host vehicle lane recognition unit 11 generates information relating to the road on which the host vehicle is to travel in the future based on the target object information that is transmitted from the ambient sensor 51. For example, the host vehicle lane recognition unit 11 generates coordinate information (positional information) of a ground surface, the three-dimensional object, and the white line by using a front end center position of the host vehicle as a starting point and by using a coordinate system which spreads in the horizontal direction and forward from the starting point. In this manner, the host vehicle lane recognition unit 11 grasps the shape of a traveling lane of the host vehicle that is partitioned by the right and left white lines, the position and orientation of the host vehicle in the traveling lane, and relative positions of the ground surface and the three-dimensional object with respect to the host vehicle. The host vehicle lane recognition unit 11 updates the coordinate information each time the target object information that is transmitted from the ambient sensor 51 is received.

The host vehicle trajectory computing unit 12 calculates a turning radius of the host vehicle based on the yaw rate detected by the yaw rate sensor 53 and the vehicle speed detected by the vehicle speed sensor 54 and calculates a trajectory of the host vehicle based on the turning radius.

The three-dimensional object trajectory computing unit 13 discriminates, based on a change in the position of the three-dimensional object, whether the three-dimensional object is the moving object or the stationary object. In a case where the three-dimensional object is the moving object, the three-dimensional object trajectory computing unit 13 calculates a trajectory of the three-dimensional object. For example, a speed at which the three-dimensional object moves in the longitudinal direction (direction in which the host vehicle travels) can be calculated from a relationship between the vehicle speed of the host vehicle and the relative speeds of the host vehicle and the three-dimensional object. In addition, a speed at which the three-dimensional object moves in the horizontal direction can be calculated from, for example, the amount of change in a distance between a lateral end position of the three-dimensional object and the white line that is detected by the ambient sensor 51. The three-dimensional object trajectory computing unit 13 calculates the trajectory of the three-dimensional object based on these speeds at which the three-dimensional object moves in the longitudinal direction and the horizontal direction. Alternatively, the three-dimensional object trajectory computing unit 13 may calculate the trajectory of the three-dimensional object based on the calculated trajectory of the host vehicle and the distance between the host vehicle and the three-dimensional object that is detected by the ambient sensor 51.

The obstacle determination unit 14 determines, based on the trajectory of the host vehicle and the trajectory of the three-dimensional object, whether or not the host vehicle collides with the three-dimensional object in a case where the three-dimensional object maintains the current state of movement (stationary state in a case where the three-dimensional object is the stationary object) and the host vehicle maintains the current traveling state. In a case where it is determined based on a result of this determination that the host vehicle collides with the three-dimensional object, the obstacle determination unit 14 recognizes the three-dimensional object as an obstacle.

The collision determination unit 15 calculates a collision prediction time TTC, which is a predicted period of time until the collision between the host vehicle and the obstacle (time to collision), by the following Equation (1) based on a distance L between the obstacle and the host vehicle and a relative speed Vr of the host vehicle with respect to the obstacle.

$$TTC = L/Vr \qquad (1)$$

In a case where the collision prediction time TTC is equal to or shorter than a collision determination threshold TTC0 set in advance, the collision determination unit 15 determines that the host vehicle is highly likely to collide with the obstacle.

In a case where it is determined that the host vehicle is highly likely to collide with the obstacle, the target deceleration computing unit 16 calculates a target deceleration for host vehicle deceleration. In a case where the obstacle is stationary, for example, a traveling distance X until the host vehicle stops can be represented by the following Equation (2), in which V is the vehicle speed of the host vehicle (=relative speed) at the present point in time, a is the deceleration of the host vehicle, and t is the length of time until the stopping of the vehicle.

$$X = V \cdot t + (1/2) \cdot a \cdot t^2 \qquad (2)$$

In addition, the time t until the stopping of the vehicle can be represented by the following Equation (3).

$$t = -V/a \qquad (3)$$

Accordingly, when Equation (2) is substituted with Equation (3), the deceleration a that is required for the host vehicle to be stopped at a traveling distance of D can be represented by the following Equation (4).

$$a = -V^2/2D \qquad (4)$$

In order for the host vehicle to be stopped at a distance of β in front of the obstacle, this traveling distance D may be set to a distance (L−β) obtained by subtracting the distance β from the distance L detected by the ambient sensor 51. In a case where the obstacle is on the move, the deceleration a may be calculated by the use of the relative speed Vr instead of the vehicle speed V.

The target deceleration computing unit 16 sets the deceleration a calculated as described above to the target deceleration. In this case, the deceleration that can be generated in the vehicle has a limit (for example, approximately −1 G). Accordingly, in a case where the absolute value of the calculated target deceleration exceeds an upper limit value, the absolute value of the target deceleration is set to the upper limit value set in advance.

Figure 2:
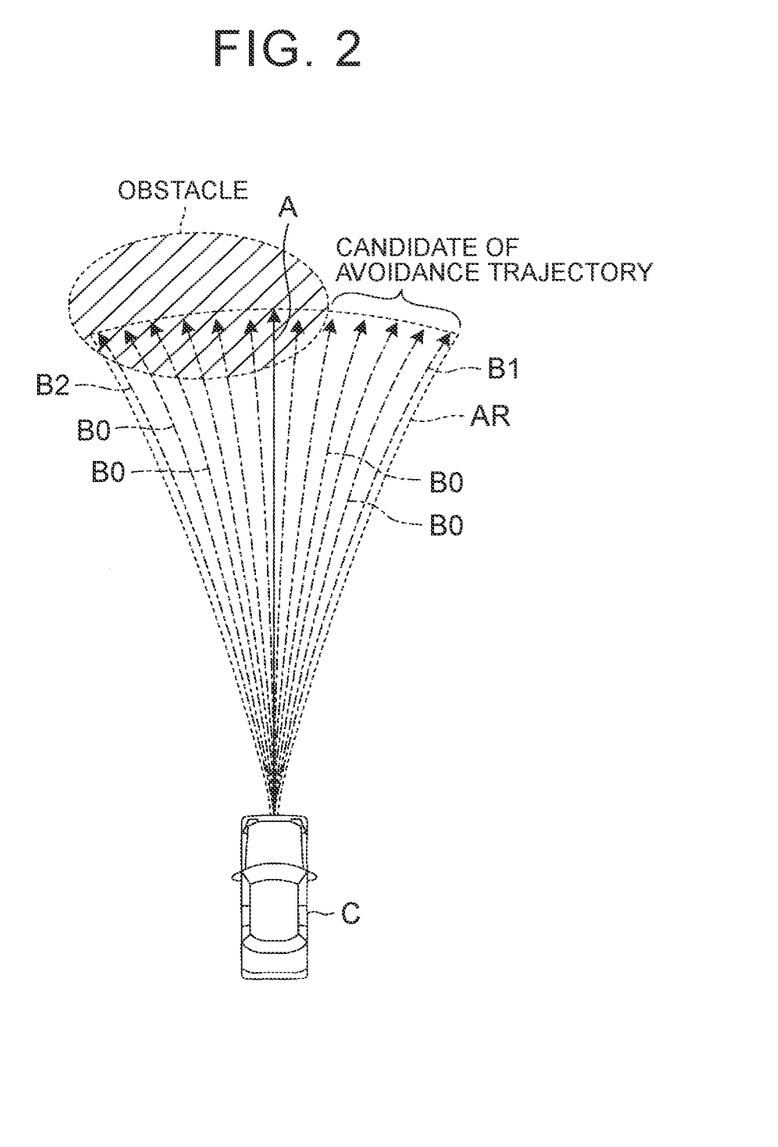
FIG. 2 is a plan view showing an avoidance trajectory of a host vehicle.

The avoidance target trajectory computing unit 17 calculates an avoidance target trajectory that can be adopted for the host vehicle to avoid the collision with the obstacle. For example, the avoidance target trajectory computing unit 17 specifies a path A through which a host vehicle C can pass in a case where the host vehicle C is assumed to travel while maintaining the current traveling state as illustrated in FIG. 2. Then, the avoidance target trajectory computing unit 17 specifies a path B1 through which the host vehicle C is predicted to pass in a case where a maximum amount of change ΔGy in lateral force for a safe turning of the host vehicle C at the current speed of the host vehicle C is added to a current lateral acceleration Gy0 of the host vehicle C and specifies a path B2 through which the host vehicle C is predicted to pass in the opposite case where the maximum amount of change ΔGy is subtracted from the current lateral acceleration Gy0 of the host vehicle C.

The avoidance target trajectory computing unit 17 obtains, as candidates of avoidance trajectories, paths B0 pertaining to cases where the lateral acceleration is changed incrementally by a predetermined amount within a range AR (traveling range) of the path B1 to the path B2. The avoidance target trajectory computing unit 17 determines, as the avoidance trajectory, a trajectory in which the host vehicle C can avoid the collision without interfering with the obstacle by turning based on a degree of interference between the avoidance trajectory candidate and the obstacle.

Figure 3:
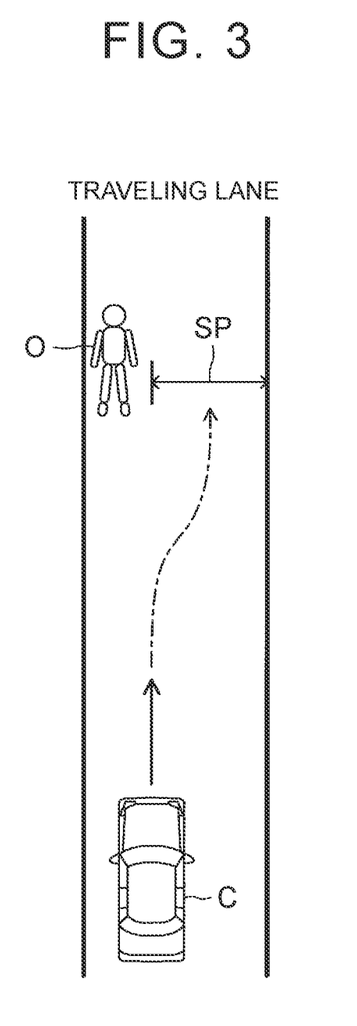
FIG. 3 is a plan view showing an avoidance space in a traveling lane.

The avoidance trajectory is a range in which the host vehicle C does not depart from the traveling lane, and is limited to a range in which ground surface formation is confirmed. In addition, the direction in which the obstacle is avoided (horizontal direction) being uniquely determined is regarded as a condition of automatic steering. In a case where an obstacle O is present on the left side in the traveling lane in front of the host vehicle C as illustrated in FIG. 3, for example, the right side from the obstacle O in the traveling lane is set to an avoidance space SP, and the avoidance trajectory through this avoidance space SP is determined. After the determination of the avoidance trajectory, the avoidance target trajectory computing unit 17 calculates a target yaw rate for allowing the host vehicle C to travel along the avoidance trajectory.

The control unit 18 transmits, to the brake ECU 20, the braking command for collision avoidance that represents the target deceleration which is calculated by the target deceleration computing unit 16. The brake ECU 20 controls the brake actuator 21 and generates a friction braking force in the vehicle wheel(s) in accordance with the target deceleration. Then, an automatic braking intervenes (is carried out).

In addition, the control unit 18 calculates a target steering angle at which the target yaw rate is obtained based on the target yaw rate that is calculated by the avoidance target trajectory computing unit 17 and the vehicle speed of the host vehicle and transmits the steering command for collision avoidance that represents this target steering angle to the steering ECU 30. The steering ECU 30 drives the steering motor 32 and steers the steering wheel in accordance with the target steering angle. Then, the automatic steering intervenes (is carried out). In a case where the automatic steering is prohibited in a collision avoidance support control routine (described later), however, the control unit 18 does not transmit the steering command for collision avoidance to the steering ECU 30.

In a case where the driver's steering operation is detected while the automatic steering is carried out, the steering ECU 30 terminates the automatic steering and carries out a steering control in accordance with the driver's steering operation (steering torque).

<Collision Avoidance Support Control Routine 1>

Figure 4:
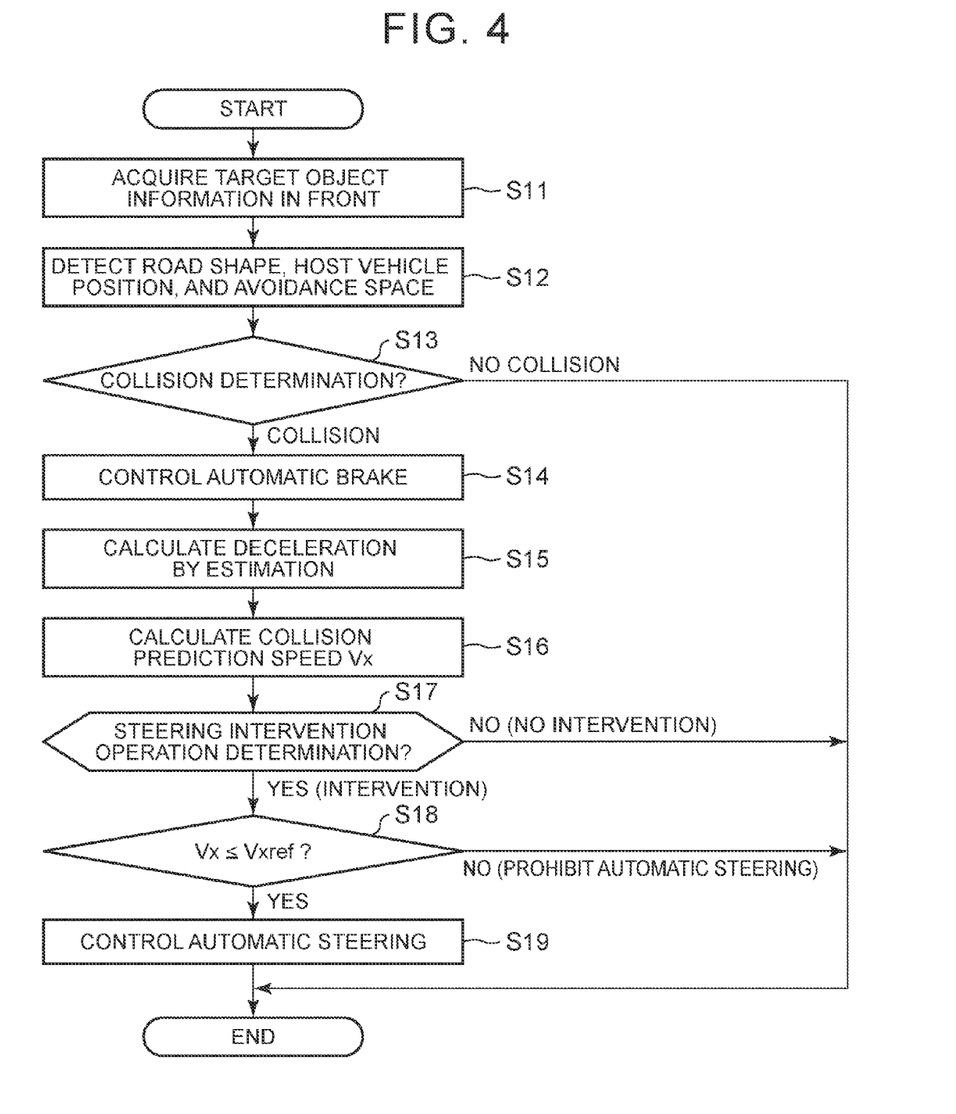
FIG. 4 is a flowchart showing collision avoidance support control routine 1.

Hereinafter, a collision avoidance support control that is executed by the support ECU 10 will be described. FIG. 4 shows the collision avoidance support control routine that is carried out by the support ECU 10. The collision avoidance support control routine is carried out by the functional units 11 to 18 described above working in tandem with each other. The collision avoidance support control routine is repeatedly carried out at a predetermined calculation cycle while an ignition switch remains ON. This calculation cycle is, for example, the same as the cycle at which the ambient sensor 51 transmits the target object information. The collision avoidance support control routine will be described with regard to the other embodiments as well, and thus the collision avoidance support control routine that is described first (FIG. 4) will be referred to as collision avoidance support control routine 1.

In Step S11, after collision avoidance support control routine 1 is started, the support ECU 10 acquires the target object information in front of the host vehicle detected by the ambient sensor 51. Then, in Step S12, the support ECU 10 determines the presence or absence of the obstacle based on, for example, the position and orientation of the host vehicle in the traveling lane and the relative position of the three-dimensional object with respect to the host vehicle based on the target object information and detects the avoidance space (avoidance target trajectory) for obstacle avoidance.

Then, in Step S13, the support ECU 10 determines the possibility of the collision between the host vehicle and the obstacle by using the collision prediction time TTC. In a case where the collision prediction time TTC is longer than the collision determination threshold TTC0, that is, in a case where it is determined that the host vehicle is unlikely to collide with the obstacle, the support ECU 10 temporarily terminates collision avoidance support control routine 1. The support ECU 10 carries out collision avoidance support control routine 1 at a predetermined calculation cycle. When the obstacle in front of the host vehicle is detected and it is detected that the collision prediction time TTC with respect to the obstacle is equal to or shorter than the collision determination threshold TTC0 while the processing of Steps S11 to S13 is repeated (S13: Yes), the support ECU 10 transmits the braking command for collision avoidance to the brake ECU 20 and generates the friction braking force in the right, left, front, and rear wheels in Step S14. This braking command is, for example, a command that represents the deceleration which is calculated in the above-described Equation (4). In this manner, the automatic braking intervenes. In this manner, the support ECU 10 supports the driver such that the host vehicle can avoid the collision with the obstacle.

Then, in Step S15, the support ECU 10 estimates the deceleration of the host vehicle at the present point in time. In this case, the support ECU 10 estimates the deceleration of the host vehicle based on the amount of change (differential value) in the vehicle speed that is detected by the vehicle speed sensor 54 (or the vehicle wheel speed that is detected by the vehicle wheel speed sensor) or the longitudinal acceleration that is detected by the acceleration sensor 55. Although collision avoidance support control routine 1 is repeated at a predetermined calculation cycle, the processing of Step S15 may be carried out after the elapse of a predetermined short setting time since the initiation of the automatic braking (after the deceleration is generated) only in the case of the initial execution of the automatic braking after the intervention.

Then, in Step S16, a predicted relative speed of the host vehicle with respect to the obstacle at a position where the host vehicle is predicted to collide with the obstacle after the host vehicle travels while being decelerated by the intervention of the automatic braking (hereinafter, referred to as a collision prediction position) is calculated. This predicted relative speed will be referred to as a collision prediction speed Vx.

For example, the time t until the collision between the host vehicle and the obstacle is obtained from the following relational expression (5), in which Vr is the relative speed of the host vehicle at the present point in time, L is the distance between the host vehicle and the obstacle, and a is the deceleration of the host vehicle (deceleration calculated in Step S15).

$$L = Vr \cdot t + (1/2) \cdot a \cdot t^2 \quad (5)$$

Accordingly, the collision prediction speed Vx, which is the relative speed in the time t, is calculated in accordance with the following Equation (6).

$$Vx = Vr + a \cdot t \quad (6)$$

This calculation is performed with the obstacle neither accelerating nor decelerating (remaining at a constant speed or remaining stationary).

Then, in Step S17, the support ECU 10 performs a steering intervention operation determination that represents the necessity of the collision avoidance by the intervention of the automatic steering. In this case, a "Yes" determination is made in a case where two conditions are satisfied, one being the collision prediction speed Vx exceeding zero, that is, a situation in which the host vehicle cannot be stopped in front of the obstacle by the automatic brake-based braking alone, and the second one being that the avoidance space (avoidance target trajectory) for obstacle avoidance is present in the traveling lane.

In a case where the steering intervention operation determination is "No" (S17: No), the support ECU 10 temporarily terminates collision avoidance support control routine 1. Then, the support ECU 10 repeats the above-described processing at a predetermined calculation cycle. In this case, a support for avoiding the collision between the host vehicle and the obstacle is performed by the automatic braking alone.

In a case where the steering intervention operation determination is "Yes", the support ECU 10 determines in Step S18 whether or not the collision prediction speed Vx is equal to or less than a collision prediction speed threshold Vxref. This collision prediction speed threshold Vxref is a value that is set to an upper limit of a range of the collision prediction speed Vx at which the automatic steering can be accurately performed.

In a case where the collision prediction speed Vx is equal to or less than the collision prediction speed threshold Vxref (S18: Yes), the support ECU 10 carries out an automatic steering control in Step S19. In other words, the support ECU 10 transmits, to the steering ECU 30, the steering command for collision avoidance that represents the target steering angle for the traveling of the host vehicle along the avoidance trajectory. Then, the automatic steering intervenes. In a case where the collision prediction speed Vx exceeds the collision prediction speed threshold Vxref (S18: No), in contrast, the support ECU 10 temporarily terminates collision avoidance support control routine 1. In this case, the support for avoiding the collision between the host vehicle and the obstacle is performed by the automatic braking alone.

Hence, according to collision avoidance support control routine 1, the automatic steering intervenes only in a case where the host vehicle is highly likely to collide with the obstacle despite the intervention of the automatic braking and the collision prediction speed Vx is equal to or less than the collision prediction speed threshold Vxref.

In a case where the collision avoidance is carried out by the intervention of the automatic steering, the accuracy of the collision avoidance during the automatic steering declines as the relative speed of the host vehicle with respect to the obstacle increases. For example, lateral and longitudinal positions of a course of the host vehicle with respect to the obstacle (traveling trajectory) are likely to vary as the relative speed increases despite a control of the steering angle of the steering wheel by the same steering control amount. In this case, the vehicle cannot be moved to a target avoidance space in some cases. In this regard, in this embodiment, the collision prediction speed Vx at the collision prediction position where the host vehicle is predicted to collide with the obstacle is estimated, and the automatic steering is not allowed to intervene in a case where the collision prediction speed Vx exceeds the collision prediction speed threshold Vxref.

Hence, according to this embodiment, the intervention of the automatic steering can be appropriately performed in a case where the automatic steering is performed in addition to the automatic braking.

<Modification Example of Collision Avoidance Support Control Routine 1>

Figure 5:
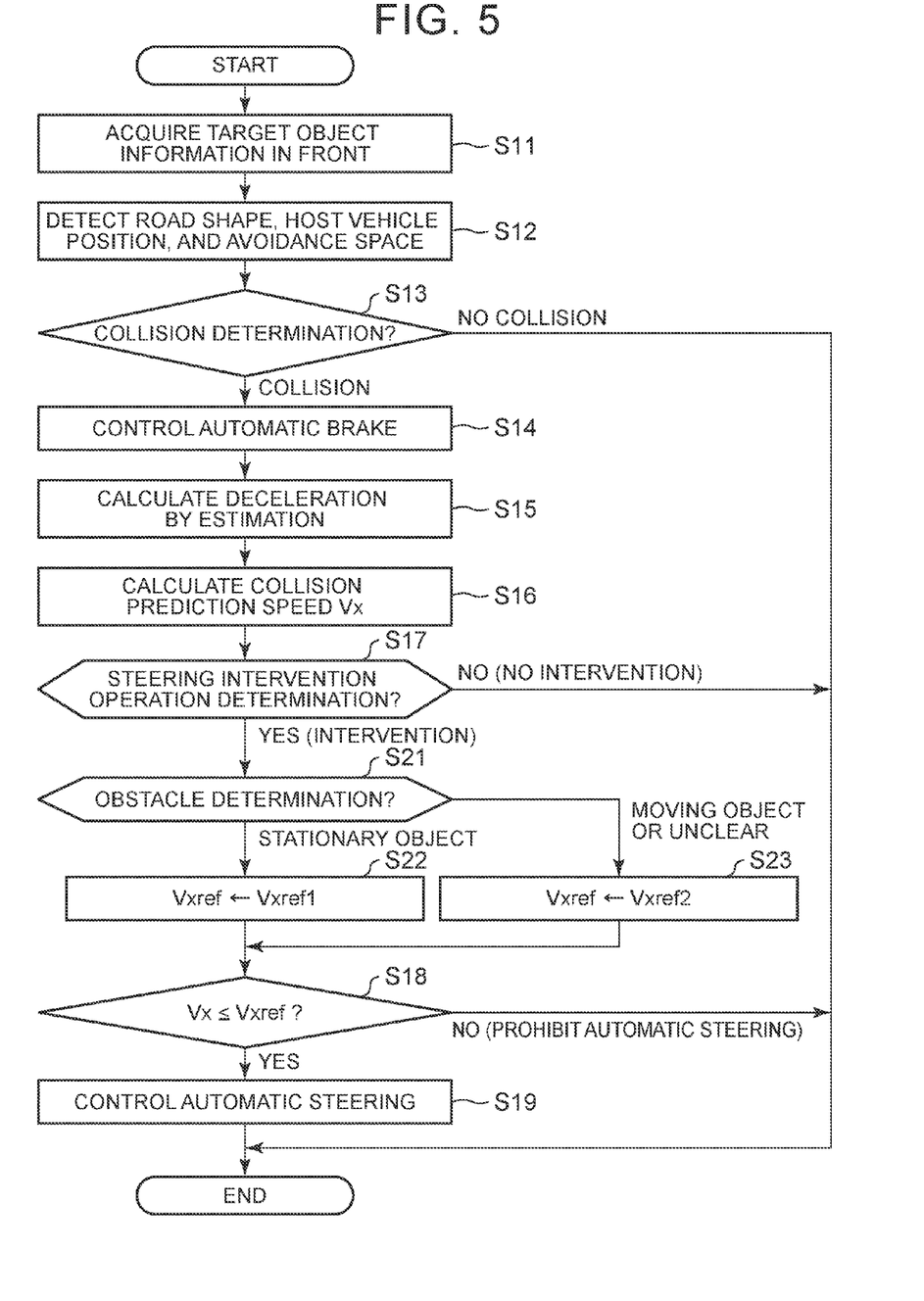
FIG. 5 is a flowchart showing a modification example of collision avoidance support control routine 1.

Hereinafter, a modification example of collision avoidance support control routine 1 will be described. In this modification example, Steps S21 to S23 are added, between Step S17 and Step S18, to collision avoidance support control routine 1 according to the embodiment as illustrated in FIG. 5. The same step numbers as in collision avoidance support control routine 1 will be used in the drawing to refer to the same processing as in collision avoidance support control routine 1, and description thereof will be omitted. In the following description, only the processing differing from that in collision avoidance support control routine 1 will be described.

In a case where the steering intervention operation determination is "Yes" in Step S17, that is, when it is determined that the collision avoidance by the intervention of the automatic steering is necessary, the support ECU 10 allows the processing to proceed to Step S21. In Step S21, the support ECU 10 discriminates whether the obstacle as a target of the collision avoidance is the stationary object or the moving object. In a case where it is determined that the obstacle is the stationary object, the support ECU 10 sets the collision prediction speed threshold Vxref to a first collision prediction speed threshold Vxref1 in Step S22. In a case where it is determined that the obstacle is the moving object, the support ECU 10 sets the collision prediction speed threshold Vxref to a second collision prediction speed threshold Vxref2 in Step S23. In a case where it cannot be discriminated whether the obstacle is the stationary object or the moving object, the support ECU 10 regards the obstacle as the moving object.

The first collision prediction speed threshold Vxref1 is a value that is set to an upper limit of a range of the collision prediction speed Vx at which the automatic steering can be accurately performed on the stationary obstacle. The second collision prediction speed threshold Vxref2 is a value that is set to an upper limit of a range of the collision prediction speed Vx at which the automatic steering can be accurately performed on the obstacle which is not stationary. Accordingly, the second collision prediction speed threshold Vxref2 is set to a vehicle speed lower than the first collision prediction speed threshold Vxref1.

After the setting of the collision prediction speed threshold Vxref in Step S22 or Step S23, the support ECU 10 allows the processing to proceed to Step S18 and determines whether or not the collision prediction speed Vx is equal to or less than the collision prediction speed threshold Vxref. Then, the support ECU 10 carries out the automatic steering control only in a case where the collision prediction speed Vx is equal to or less than the collision prediction speed threshold Vxref.

According to this modification example, the collision prediction speed threshold Vxref is set to a higher value in a case where the obstacle is the stationary object than in a case where the obstacle is the moving object.

The amount of movement of the obstacle needs to be taken into account in a case where the collision avoidance is carried out by the automatic steering, and a variation of the amount of movement occurs in a case where the obstacle is the moving object. Accordingly, in a case where the obstacle is the moving object (including a case where the type of the obstacle is unknown), the traveling course of the host vehicle based on the automatic steering needs to be controlled with a high level of accuracy. In a case where the obstacle is the stationary object, in contrast, the accuracy of the traveling course control based on the automatic steering can be loosened compared to a case where the obstacle is the moving object.

In this embodiment, the collision prediction speed threshold Vxref is set to a higher value in a case where the obstacle is the stationary object than in a case where the obstacle is the moving object. Accordingly, the automatic steering is more likely to intervene in a case where the obstacle is the stationary object than in a case where the obstacle is the moving object. Hence, according to this modification example 1, an appropriate intervention of the automatic steering can be performed in accordance with the type of the obstacle (moving object/stationary object).

The collision prediction speed threshold Vxref that is used in Step S18 of the above-described collision avoidance support control routine 1 (FIG. 4) may be set to a value which is equivalent to the second collision prediction speed threshold Vxref2. Then, the traveling course of the host vehicle based on the automatic steering can be controlled with a high level of accuracy regardless of the type of the obstacle (moving object/stationary object).

<Collision Avoidance Support Control Routine 2>

Figure 6:
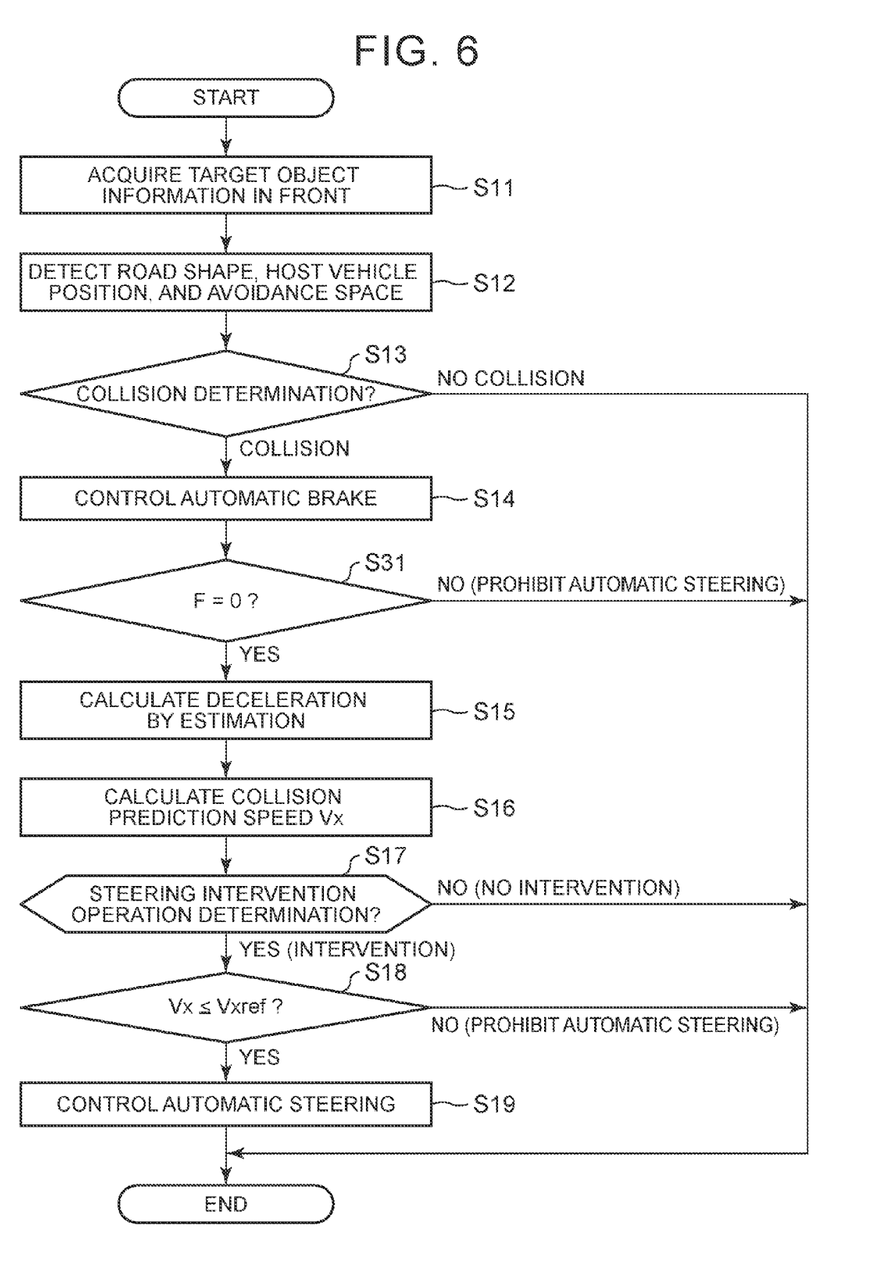
FIG. 6 is a flowchart showing collision avoidance support control routine 2.

Hereinafter, another embodiment of the collision avoidance support control routine (hereinafter, referred to as collision avoidance support control routine 2) will be described. FIG. 6 is a flowchart showing collision avoidance support control routine 2. This collision avoidance support control routine 2 is collision avoidance support control routine 1 (including the modification example thereof) to which the processing of Step S31 is added. The same step numbers as in collision avoidance support control routine 1 will be used in the drawing to refer to the same processing as in collision avoidance support control routine 1, and description thereof will be omitted. In the following description, only the processing differing from that in collision avoidance support control routine 1 will be described.

Figure 7:
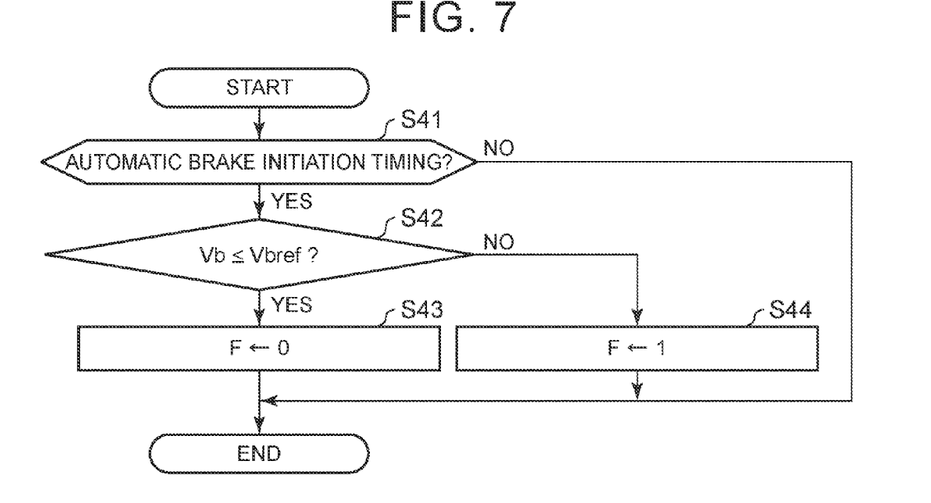
FIG. 7 is a flowchart showing a flag setting routine.

After the initiation of the automatic braking in Step S14, the support ECU 10 determines in Step S31 whether or not a steering prohibition flag F is "0". This steering prohibition flag F is set through a flag setting routine that is illustrated in FIG. 7. The flag setting routine is repeatedly carried out at a predetermined calculation cycle by the support ECU 10 in tandem with collision avoidance support control routine 2.

Referring to FIG. 7, in Step S41 of the flag setting routine, the support ECU 10 determines whether or not the present point in time is a timing when the automatic braking is initiated. In other words, it is determined whether or not the present point in time is immediately after the initiation of the automatic braking that is carried out in Step S14 of the collision avoidance support control routine. Although the support ECU 10 repeats the flag setting routine at a predetermined calculation cycle, the support ECU 10 makes a "Yes" determination in Step S41 only the first time immediately after the initiation of the automatic braking. In a case where the present point in time is not immediately after the initiation of the automatic braking, the support ECU 10 temporarily terminates the flag setting routine.

In a case where the present point in time is immediately after the initiation of the automatic braking, the support ECU 10 detects a speed during the intervention of the braking Vb, which represents the relative speed of the host vehicle with respect to the obstacle at the present point in time, and determines whether or not the speed during the intervention of the braking Vb is equal to or less than a speed threshold during the intervention of the braking Vbref in Step S42. In a case where the speed during the intervention of the braking Vb is equal to or less than the vehicle speed threshold during the intervention of the braking Vbref (S42: Yes), the support ECU 10 sets the steering prohibition flag F to "0" in Step S43. In a case where the speed during the intervention of the braking Vb exceeds the vehicle speed threshold during the intervention of the braking Vbref (S42: No), the support ECU 10 sets the steering prohibition flag F to "1" in Step S44. The steering prohibition flag F at "1" represents a situation in which the intervention of the automatic steering is prohibited, and the steering prohibition flag F at "0" represents a situation in which the intervention of the automatic steering is not prohibited.

After the setting of the steering prohibition flag F in Step S43 or Step S44, the support ECU 10 temporarily terminates the flag setting routine. The steering prohibition flag F is reset to "0" at, for example, a point in time when a series of collision avoidance support processing is terminated (a point in time when the avoidance of the collision is detected or a point in time when a certain period of time has elapsed since the initiation of the automatic braking).

Proceeding back to collision avoidance support control routine 2, the support ECU 10 reads the steering prohibition flag F set in the flag setting routine and determines whether or not the steering prohibition flag F is "0" in Step S31. In a case where the steering prohibition flag F is "0" (S31: Yes), the support ECU 10 allows the processing to proceed to Step S15 and carries out the above-described processing.

In a case where it is determined in Step S31 that the steering prohibition flag F is "1", the intervention of the automatic steering is prohibited, and thus collision avoidance support control routine 2 is temporarily terminated. Accordingly, only the automatic braking is carried out without the intervention of the automatic steering.

In collision avoidance support control routine 2, the speed during the intervention of the braking Vb is detected and it is determined whether or not the detected speed during the intervention of the braking Vb is higher than the vehicle speed threshold during the intervention of the braking Vbref at a time of the intervention of the automatic braking. In a situation in which the host vehicle is predicted to collide with the obstacle despite the intervention of the automatic braking being received, the host vehicle is decelerated with a deceleration close to a limit, and thus the deceleration is subjected to no significant variation. Accordingly, the collision prediction speed can be estimated to some extent from the speed during the intervention of the braking Vb.

In collision avoidance support control routine 2, the intervention of the automatic steering is prohibited in a case where the speed during the intervention of the braking Vb is higher than the vehicle speed threshold during the intervention of the braking Vbref. Hence, according to collision avoidance support control routine 2, the automatic steering can be allowed to intervene only in a case where it is estimated that the host vehicle course control can be accurately carried out in the current situation as in collision avoidance support control routine 1. In addition, the prohibition of the intervention of the automatic steering can be determined at a point in time when it is determined that the speed during the intervention of the braking Vb is higher than the vehicle speed threshold during the intervention of the braking Vbref, that is, in an early stage in which the automatic braking intervenes. Accordingly, the subsequent calculation load of the microcomputer can be reduced.

In collision avoidance support control routine 2, an automatic steering prohibition determination processing based on the collision prediction speed Vx is carried out after Step S15. However, the automatic steering prohibition determination processing based on the collision prediction speed Vx is optional and may be omitted. In other words, the determination of whether or not to prohibit the automatic steering may be based solely on the determination of whether or not the speed during the intervention of the braking Vb is higher than the vehicle speed threshold during the intervention of the braking Vbref (as a matter of course, the automatic steering is prohibited in a case where no collision avoidance route is present).

<Modification Example of Flag Setting Routine>

Figure 8:
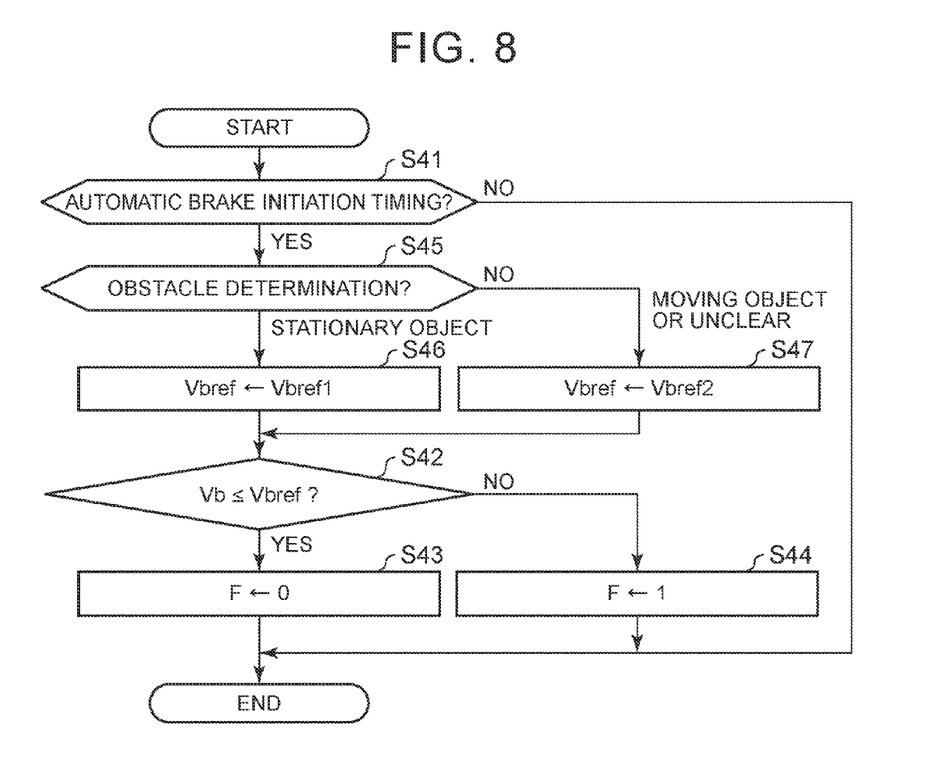
FIG. 8 is a flowchart showing a modification example of the flag setting routine.

Hereinafter, a modification example of the flag setting routine (hereinafter, referred to as flag setting routine 2) will be described. FIG. 8 is a flowchart showing flag setting routine 2. In this flag setting routine 2, the processing of Steps S45 to S47 is added, between Step S41 and Step S42, to the above-described flag setting routine illustrated in FIG. 7 (hereinafter, referred to as flag setting routine 1). The same step numbers as in flag setting routine 1 will be used in the drawing to refer to the same processing as in flag setting routine 1, and description thereof will be omitted. In the following description, only the processing differing from that in flag setting routine 1 will be described.

In a case where it is determined in Step S41 that the present point in time is the timing when the automatic braking is initiated, the support ECU 10 allows the processing to proceed to Step S45. In Step S45, the support ECU 10 determines whether or not the obstacle as the target of the collision avoidance is the stationary object or the moving object. In a case where it is determined that the obstacle is the stationary object, the support ECU 10 sets the vehicle speed threshold during the intervention of the braking Vbref to a first vehicle speed threshold during the intervention of the braking Vbref1 in Step S46. In a case where it is determined that the obstacle is the moving object, the support ECU 10 sets the vehicle speed threshold during the intervention of the braking Vbref to a second vehicle speed threshold during the intervention of the braking Vbref2 in Step S47. In a case where it cannot be discriminated whether the obstacle is the stationary object or the moving object, the support ECU 10 regards the obstacle as the moving object.

The first vehicle speed threshold during the intervention of the braking Vbref1 is a vehicle speed threshold during the intervention of the braking at which it is estimated that the collision prediction speed threshold Vxref is substantially equal to the first collision prediction speed threshold Vxref1. The second vehicle speed threshold during the intervention of the braking Vbref2 is a vehicle speed threshold during the intervention of the braking at which it is estimated that the collision prediction speed threshold Vxref is substantially equal to the second collision prediction speed threshold Vxref2. Accordingly, the second vehicle speed threshold during the intervention of the braking Vbref2 is set to a vehicle speed that is lower than the first vehicle speed threshold during the intervention of the braking Vbref1.

After the setting of the vehicle speed threshold during the intervention of the braking Vbref in Step S46 or Step S47, the support ECU 10 allows the processing to proceed to Step S42 and sets the steering prohibition flag F based on whether or not the speed during the intervention of the braking Vb at the present point in time is equal to or less than the vehicle speed threshold during the intervention of the braking Vbref by using the vehicle speed threshold during the intervention of the braking Vbref.

By this flag setting routine 2 being applied, an appropriate intervention of the automatic steering can be performed in accordance with the type of the obstacle (moving object/stationary object).

<Modification Example of Collision Prediction Speed Vx>

In the above-described collision avoidance support control routines 1 and 2 and the modification examples thereof, the predicted relative speed of the host vehicle with respect to the obstacle at the collision prediction position is used as the collision prediction speed Vx. However, the vehicle speed of the host vehicle at the collision prediction position can be used instead. The accuracy of the control of the traveling course of the host vehicle with respect to the obstacle might decline as the speed of the host vehicle increases. In this regard, effects similar to those of the embodiment can be achieved even by the use of the vehicle speed of the host vehicle at the collision prediction position as the collision prediction speed Vx determining the prohibition of the intervention of the automatic steering. In this case, the collision prediction speed Vx may be calculated with the relative speed Vr in Equation (6) substituted with the vehicle speed V of the host vehicle.

<Modification Example of Speed During Intervention of Braking Vb>

In the above-described collision avoidance support control routine 2 and the modification example thereof, the relative speed of the host vehicle with respect to the obstacle immediately after the initiation of the automatic braking is used as the speed during the intervention of the braking Vb. However, the vehicle speed of the host vehicle immediately after the initiation of the automatic braking can be used instead. The accuracy of the control of the traveling course of the host vehicle with respect to the obstacle might decline as the speed of the host vehicle increases. In this regard, effects similar to those of the embodiment can be achieved even by the use of the vehicle speed of the host vehicle immediately after the initiation of the automatic braking as the speed during the intervention of the braking Vb determining the prohibition of the intervention of the automatic steering.

The collision avoidance support device according to embodiments has been described above. The disclosure is not limited to the embodiments and modification examples described above, and can be modified in various forms without departing from the purpose of the disclosure.

What is claimed is:

1. A collision avoidance support device comprising:
   an obstacle detector configured to detect whether an obstacle is present in front of a host vehicle; and
   a control system that controls: (i) an automatic braking system to cause automatic braking, in which a braking force is generated in a vehicle wheel, to occur in a case where the host vehicle is determined to likely collide with a detected obstacle, and (ii) an automatic steering system to cause automatic steering, in which a steering wheel of the host vehicle is automatically turned to perform collision avoidance, to occur in the case where the host vehicle is determined to likely collide with the detected obstacle despite deceleration of the host vehicle caused by the automatic braking, wherein the control system (a) estimates whether or not a collision prediction speed representing a predicted relative speed of the host vehicle with respect to the detected obstacle or representing a vehicle speed of the host vehicle at a position where the host vehicle is predicted to collide with the detected obstacle after traveling while being decelerated by the automatic braking is higher than a collision speed threshold without performing the automatic steering, or (b) estimates whether or not a braking initiation speed during the automatic braking representing the relative speed of the host vehicle with respect to the detected obstacle or representing the vehicle speed of the host vehicle at a time of initiation of the automatic braking is higher than a speed threshold without performing the automatic steering, the control system prohibits performance of the automatic steering when the control system estimates that the collision prediction speed is higher than the collision speed threshold or that the braking initiation speed is higher than the speed threshold, and the control system is configured to detect the braking initiation speed at the initiation of the automatic braking and determine whether or not the detected braking initiation speed is higher than the speed threshold at the initiation of the automatic braking.

2. The collision avoidance support device according to claim 1, wherein the control system is configured to calculate the collision prediction speed at a predetermined calculation cycle and determine whether or not the calculated collision prediction speed is higher than the collision speed threshold when the host vehicle travels while being decelerated by the automatic braking.

3. The collision avoidance support device according to claim 2, wherein the control system:

determines whether the detected obstacle is a stationary object or a moving object; and sets the collision speed threshold to a higher value in a case where it is determined that the obstacle is the stationary object than in a case where it is determined that the obstacle is the moving object.

4. A collision avoidance support device comprising:

a sensor configured to detect whether an obstacle is present in front of a host vehicle;

a first ECU configured to perform a braking control that generates a braking force in a vehicle wheel of the host vehicle;

a second ECU configured to perform a steering control that steers a steering wheel of the host vehicle; and a third ECU configured to (i) calculate a length of time until a collision of the host vehicle with a detected obstacle detected by the sensor, (ii) instruct the first ECU to perform the braking control in a case where the length of time until the collision exceeds a first threshold, (iii) estimate a collision prediction speed, which is a vehicle speed at a position where the host vehicle is estimated to collide with the detected obstacle, in a case where deceleration of the host vehicle by the braking control is performed, (iv) instruct the second ECU to perform the steering control in a case where the collision prediction speed exceeds a second threshold, and (v) not instruct the second ECU to perform the steering control (a) in a case where the collision prediction speed exceeds a third threshold that exceeds the second threshold or (b) in a case where a relative speed of the host vehicle with respect to the detected obstacle or the vehicle speed of the host vehicle at a time of initiation of the braking control exceeds a fourth threshold wherein the third CPU is configured to detect a braking initiation speed at the time of the initiation of the braking control and determine whether or not the detected braking initiation speed is higher than the fourth threshold at the initiation of the braking control.

* * * * *